Aug. 31, 1937.  J. B. SCOTT  2,091,692
FILM MOVEMENT APPARATUS
Filed July 24, 1934
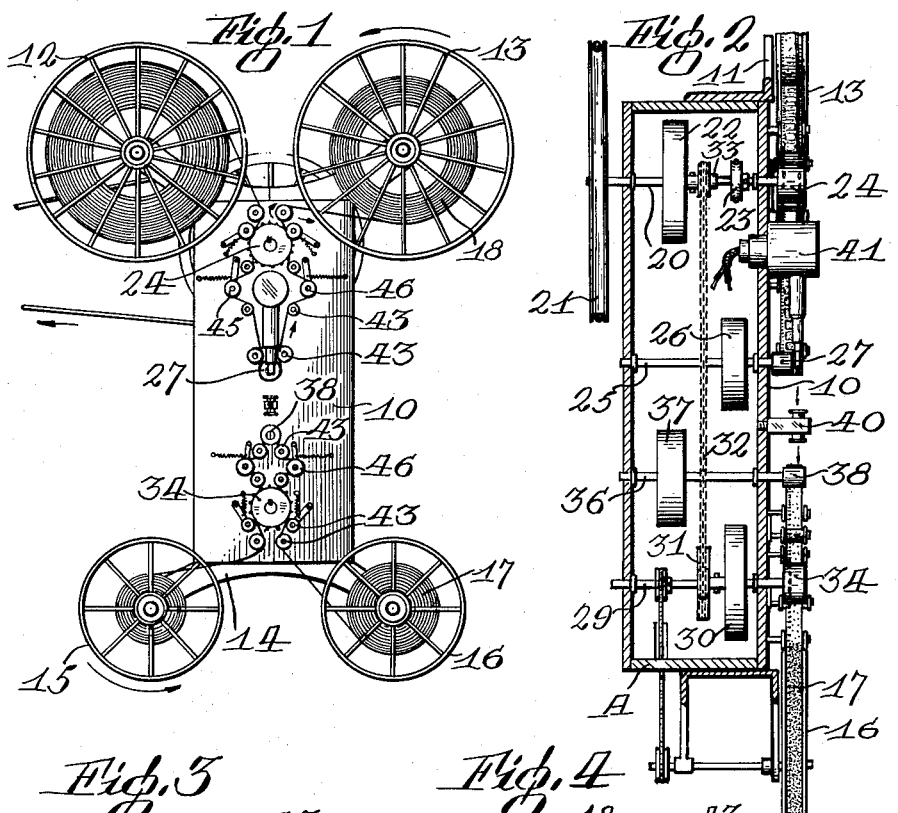
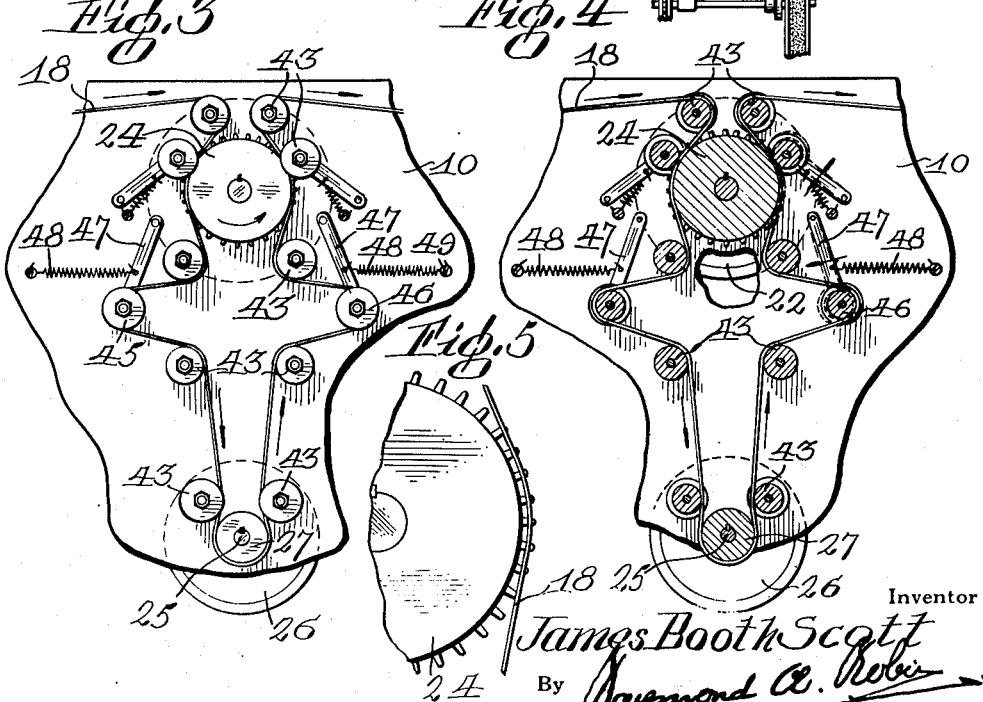
Inventor
James Booth Scott
By Raymond A. Robi
Attorney Patented Aug. 31, 1937

2,091,692

UNITED STATES PATENT OFFICE 2,091,692

FILM MOVEMENT APPARATUS

James Booth Scott, Montreal, Quebec, Canada

Application July 24, 1934, Serial No. 736,707

6 Claims. (Cl. 271—2.3)

The present invention relates to film movement mechanism for motion picture apparatus.

An important object of the invention is the provision of mechanism for moving motion picture films at practically uniform speed past a predetermined point.

A further object of the invention is the provision of film moving mechanism designed so as to counteract variation in the movement due to distortion of the film.

Another object of the invention is the provision of mechanism for moving a motion picture sound film at very substantially constant speed past the light aperture of the apparatus.

A still further object of the invention is the provision of film movement mechanism of the above character embodying automatically operable compensating rollers.

Still another object of the invention is the provision of film movement mechanism of the above character embodying inertia rollers having connection with a fly wheel adapted to oppose fluctuations in the rotary movement of the roller.

Other objects and advantages of the invention will become apparent as the description progresses.

In the accompanying drawing forming a part of this specification and in which like reference characters are employed to designate corresponding parts throughout the same:

Figure 1 is a front elevation of the film printing machine, equipped with the new mechanism, Figure 2 is a side elevational view of the same, partly in section, Figure 3 is an enlarged fragmentary front elevational view of the same, Figure 4 is a similar view showing the mechanism partly in section, and Figure 5 is a fragmentary front elevation of the drive sprocket showing the portion of the film engaging the same.

Referring to the drawing, wherein for the purpose of illustration I have shown the new mechanism in conjunction with an optical reduction film printing apparatus, the letter A generally designates the frame of the machine.

The frame A, which in the present example is of elongated rectangular form, embodies a front panel 10 equipped at the top with brackets 11 adapted to support a pair of conventional film reels 12 and 13, the film being unwound from the reel 12 and wound upon the complementary reel during the printing operation. The bottom of the front panel 10 is equipped with similar bracket structure 14 rotatably supporting reels 15 and 16 carrying the reduced film 17 to be printed from the original film 18 carried by the upper reels. In the present instance, the original film is of standard 35 mm. width, the reduced film being 16 mm. Inasmuch as a length of 35 mm. film, corresponding in projection time to an equivalent quantity of 16 mm. film, is 2½ times longer, the smaller film travels slower, as explained further on. An optical unit 40 projects a slightly reduced image of the illuminated section of the 35 mm. film upon the sensitized surface of the 16 mm. film. In this case, the combination of the optical and mechanical reductions produces a reversed replica of the original image reduced 60 percent in length and approximately 17 percent in width.

In the upper portion of the frame A is rotatably journalled a horizontal drive shaft 20 having attached to the rear extremity a pulley wheel 21 having drive connection with a suitable source of drive power. On the intermediate portion of the shaft 20 is secured a fly wheel 22 and, adjacent the fly wheel, a relatively small drive pulley 23 affording belt drive connection actuating the take up reel 13. On the forward portion of the drive shaft 20 is secured a positive drive element 24 usually constituting a sprocket wheel formed with radially projecting teeth disposed to engage the apertures in the film 18.

Below the shaft 20 is journalled a shaft 25 having secured thereon a fly wheel 26. On the forward end portion of the shaft 25 is rigidly secured a smooth roller 27 disposed so that the film 18 may be suitably trained thereover and herein called "inertia" roller.

At the lower portion of the frame is journalled a shaft 29 having a fly wheel 30 fixed thereon and carrying a sprocket 31 engaging a drive chain 32. The upper portion of the drive chain 32 is trained over a sprocket 33 on the upper drive shaft 20, the chain connection affording means for driving the lower shaft 29 in synchronism with but at a reduced speed relative to the rotary speed of the shaft 20. On the forward end portion of the shaft 29 is secured a drive sprocket 34 corresponding to the sprocket 24 of the upper film moving mechanism.

Above the shaft 29 is journalled a parallel shaft 36 having a fly wheel 37 fixed on the intermediate portion and having an inertia roller 38 secured on the forward end portion, corresponding to the roller 27 forming part of the upper film moving mechanism.

Any preferred type of reducing lens system 40 and source of light 41 in combination with a narrow aperture may be employed for the 16 mm. film printing operation.

The upper and lower film moving mechanisms embody a plurality of guide rollers 43 arranged so that sections of the film will be trained properly over diametrically opposed sides of the drive sprockets 24 and 34 and about the inertia rollers 27 and 38, respectively.

Intermediate the drive sprocket and inertia rollers the film is trained over a pair of compensating rollers 45 and 46. These rollers are journalled upon pivotally supported arms 47 arranged in transversely spaced positions on the panel enabling the rollers 45 and 46 to swing laterally. The roller carrying arms 47 are normally urged to laterally diverging positions by means of springs 48, each spring having one end attached to the intermediate portion of the arm while the opposed or outer end is secured to a fastener 49 on the frame panel. Thus, the rollers 45 and 46 normally form lateral loops in the complementary side portions of the film, as shown to advantage at Figures 3 and 4.

With particular reference to the film arrangement as illustrated at Figures 3 and 4, it will be noted that the film is trained so as to form a vertically elongated loop below the drive sprocket 24 and auxiliary lateral loops as it is trained over the resiliently mounted rollers 45 and 46. The lower portion of the vertical loop is defined by the training of the film about the inertia roller designed to be frictionally engaged by the film, the frictional engagement being enhanced by the tension exerted on the film by the compensating rollers. The vertical loop of the film is driven downwardly at one side and drawn upwardly on the other by the double contact of the film with laterally opposed sides of the drive sprocket.

When the film is in a normal condition, the uniform rotation of the sprocket will move the film at a constant speed past the light aperture. It is well known, however, that motion picture film, under ordinary conditions, will become more or less distorted, due primarily to shrinkage which occurs due to age or other causes. This shrinkage causes the film to assume abnormal positions on the drive sprocket, that is, the distortion in the relative space of the apertures will cause the film to engage the outer end portions of the sprocket teeth, as shown at Figure 5, and prevent proper positioning of the film in direct contact with the periphery of the sprocket wheel which is the normal position, as shown at Figure 3. This displacement of the film on the sprocket increases the radius between the film and the axis of the sprocket and correspondingly tends to increase the speed of the film movement relative to the normal operating speed. In consequence, the film assumes a fluctuating or variable motion as it rides upon the engaging teeth of the sprocket causing an image distortion upon the print being produced. This distorted image has the effect (in the case of sound reproduction) of producing audible distortion which is commonly known as flutter or "wow-wows".

An essential characteristic of the present invention resides in the provision of means for stabilizing the movement of the film at essential points, that is, providing means for compensating for such fluctuations whereby the motion of the film is maintained at practically constant speed at essential points. As will be noted from Figures 3 and 4, the film has an efficient frictional engagement with the inertia roller 27 which is rotated at a practically invariable speed due to the connection of the fly wheel 26 which opposes, by its inertia, sudden fluctuations in the speed of the roller. When the sprocket engages shrunken film and thereby drives the same at a fluctuating speed during its downward movement, the fluctuation is counter-acted by the resilient mounting of the compensating roller 45 so as to obviate slippage of the film upon the take-off roller 27. By analogous operation fluctuation in the outward drawing of the opposite side of the film loop is counteracted by resilient lateral movement of the complementary compensating roller 46. In other words, the inertia roller preventing sudden speed variations of the film trained thereover, due to the inertia of the fly wheel and the frictional resistance between the film and the roller itself, it follows that compensation must be had at another point whenever the film tends to jerk at the driving sprocket, due to the action explained previously. Thus, whenever the film tends to stretch between the sprocket and inertia roller, the compensating roller on that side is pulled inwardly towards the axis of the machine, maintaining constant the tension of the film around the inertia roller. Conversely, should the film tend to slacken the compensating roller moves outwardly to take up the slackness, maintaining again a constant tension so as not to disturb the uniform movement of the film at the inertia roller. Obviously, the actions presently described occur at a high rate of speed, as evidenced by the oscillating motion of the compensating rollers when the machine is operated.

Consequently, the intermediate bottom portion of the film loop, trained over the roller 27, is moved at a uniform speed obviating distortion at the imaging aperture due to periodic slippage of the film.

As will be noted at Figures 1 and 2 the stabilizing or compensating mechanism is associated with the mechanism for guiding both the negative and positive films so that both films are moved at unvarying speeds in alignment with the light aperture. As a result, the printing of motion picture sound positives or negatives as well as reduction prints may be effected without distortion due to such fluctuation.

While the mechanism has been shown applied to film printing machines it is, of course, apparent that the same may be applied to other types of motion picture apparatus, or sound reproduction devices wherein the movement of the sound medium must be maintained at constant speed.

It is to be understood that the form of my invention herein shown and described is to be taken as a preferred example of the same, and that various changes as to the shape, size and arrangement of parts may be resorted to without departing from the spirit or the scope of the subjoined claims.

Having thus described my invention, I claim:—

1. In film movement mechanism, the combination of a toothed drive sprocket adapted to engage two sides of a film loop, an inertia roller positively driven by the looped portion of the film which is trained thereover, and independent compensating rollers engaging separate looped portions of the film and adapted to automatically counteract variations in the length of the film between the drive sprocket and the inertia roller.

2. In mechanism of the character described, the combination of a film engaging drive sprocket, an inertia roller having a fly wheel connected therewith and engaged by a looped extension of the film for positively driving said wheel, and independently acting compensating rollers engaging the film between the drive sprocket and inertia roller and adapted to maintain constant the tension of the film on both sides of the roller so that the film moves at a constant speed therewith.

3. In film driving apparatus, the combination with film driving sprocket means, of freely journalled inertia means adapted to be driven solely by film trained thereover, and independent resilient means adapted to maintain substantially constant the tension of the film on both sides of said inertia means.

4. In film movement mechanism, a rotary driving sprocket engaging both sides of an enlarged film loop, a freely journalled shaft, a roller on said shaft over which the film loop is trained for driving purposes, a fly-wheel on the shaft, and resilient means independently acting on said film before and after the roller adapted to maintain the film under constant tension on both sides of the roller.

5. A film driving device comprising film driving means, a film-driven inertia roller over which said film is trained, and independently acting spring means operating on the film between the roller and driving means to maintain at all times a tension on the film on both sides of the roller.

6. In film movement mechanism, the combination of a toothed drive sprocket adapted to engage two sides of a film loop, an inertia roller freely journalled and adapted to be driven by the film loop which is trained thereover, and independently acting compensating spring rollers pressing on said film between the sprocket and roller, on both sides thereof, so that a tension is constantly imparted to the film as it reaches and leaves the said roller.

JAMES BOOTH SCOTT.